United States Patent [19]

Weiler

[11] Patent Number: 5,238,090
[45] Date of Patent: Aug. 24, 1993

[54] DISC BRAKE HOUSING WITH CONTINUOUS OUTSIDE CIRCUMFERENTIAL EDGE AND COOLING RIBS

[76] Inventor: Rolf Weiler, Zum Kohlwaldfeld 20, 6239 Eppstein 2, Fed. Rep. of Germany

[21] Appl. No.: 689,854
[22] PCT Filed: Jun. 30, 1990
[86] PCT No.: PCT/EP90/01050
  § 371 Date: Jun. 6, 1991
  § 102(e) Date: Jun. 6, 1991
[87] PCT Pub. No.: WO91/05176
  PCT Pub. Date: Apr. 18, 1991

[30] Foreign Application Priority Data

Oct. 6, 1989 [DE] Fed. Rep. of Germany ....... 3933395

[51] Int. Cl.⁵ .................... F16D 55/224; F16D 65/02
[52] U.S. Cl. ............................... 188/71.6; 188/73.31; 188/264 AA
[58] Field of Search .................. 188/73.1, 73.31, 71.1, 188/369, 370, 264 R, 264 A, 264 AA, 71.6, 73.35, 73.38

[56] References Cited

U.S. PATENT DOCUMENTS

| | | | |
|---|---|---|---|
| 3,081,843 | 3/1963 | Dotto et al. | 188/370 X |
| 3,251,436 | 5/1966 | Afanador et al. | 188/370 X |
| 3,388,774 | 6/1968 | Burnett | 188/73.35 |
| 3,455,417 | 7/1969 | Takata | 192/111 A |
| 4,219,106 | 8/1980 | Lüpertz et al. | 188/73.32 |
| 4,220,223 | 9/1980 | Rinker et al. | 188/73.1 |
| 4,225,017 | 9/1980 | Op den Camp | 188/73.38 |
| 4,591,028 | 5/1986 | Hagiwara et al. | 188/72.2 |
| 4,709,789 | 12/1987 | Czich et al. | 188/73.44 |
| 4,754,856 | 7/1988 | Villata | 188/370 X |
| 4,776,435 | 10/1988 | Morita | 188/73.31 X |
| 4,809,825 | 3/1989 | Oltmanns, Jr. et al. | 188/73.38 X |
| 5,002,160 | 3/1991 | Weiler et al. | 188/71.6 |

FOREIGN PATENT DOCUMENTS 2231928 11/1990 United Kingdom ............... 188/1.11

Primary Examiner—Robert J. Oberleitner
Assistant Examiner—Josie A. Ballato
Attorney, Agent, or Firm—Robert P. Seitter; J. Gordon Lewis

[57] ABSTRACT

The invention relates to a spot-type disc brake, in particular for automotive vehicles, with two brake carrier arms being positioned at a distance from each other in the direction of a secant in respect of the brake disc, with two brake shoes resting radially on the brake carrier arms, with a brake housing which straddles the brake shoes and the brake disc in a U-shaped manner, with a piston-and-cylinder unit being positioned within a first, internal stem of the housing and by means of which the first brake shoe allows to be urged directly against a first side of the brake disc, and with a second, external stem being coupled to the first stem through a bridge section and urging the second, external brake shoe indirectly against the other side of the brake disc. According to the invention, the external stem has a continuous and uninterrupted bearing surface which bears against the second, external brake shoe resulting in a closed design of the external stem. A closed design is one where there is no gap in the radial direction of the second external stem. A closed design is achieved by configuring the second external stem with a radially innermost edge which extends in a substantially circumferential direction along its entire length. The disc brake may include external ribs for cooling or for stability. The disc brake has tangential ends which are coupled to brake carrier arms.

25 Claims, 4 Drawing Sheets

DISC BRAKE HOUSING WITH CONTINUOUS OUTSIDE CIRCUMFERENTIAL EDGE AND COOLING RIBS

TECHNICAL FIELD

The present invention relates to a spot-type disc brake, in particular for automotive vehicles.

BACKGROUND OF THE INVENTION

A spot-type disc brake of a kind under consideration is known from the German printed and examined patent application No. 2,804,808 such a spot-type disc brake is provided with two brake carrier arms positioned at a distance from each other in the direction of a secant in respect of the brake disc with the movement of two brake shoes guided by the brake carrier arms. An external stem of the brake housing which urges the indirectly actuated brake shoe against the brake disc has a circular opening. The external stem is, thus, divided into two in the secant direction with two fist fingers being disposed symmetrically in respect of an axis of symmetry. In the event of an actuation of the brake, the individual fingers are expanded in spite of a material accumulation, so that a tangentially inclined wear of the external brake shoe is possible.

SUMMARY OF THE INVENTION

It is the object of the recent invention to improve an external stem of a brake housing. In particular, a tangentially inclined wear of the external brake shoe is to be avoided and an axial mounting space for the external stem of a brake housing is to be reduced.

This object is achieved according to the characteristic features of the present invention, because the external stem of the fist-type brake housing has a closed design, so that the clearance provided for a tool which is disposed between the state-of-the-art fist fingers of the external stem is filled up with cast metal. In this way, the radial length of the external stem can be reduced, on one hand, and the axial extension of the external stem as a whole can be diminished, on the other hand. In addition, a noise reduction is advantageously, attained when the brake is being operated. The two fingers of the external stem are, thus, connected to each other along the lines of an integrated design.

In one advantageous embodiment of the present invention the lower edge of the external stem extends at a constant radial distance from the disc-shaped contour of the brake disc. Advantageously, a uniform distribution of the pressure exerted on the brake disc is achieved over the circumference of the brake shoe, and this leads in an advantageous manner to a uniform distribution of cast metal for the external stem.

Ribs running in circumferential direction on the outer side of the external stem advantageously serve-to dissipate frictional heat.

A lifting-out tooth projecting in the secant direction makes a catch beneath one of the brake carrier arms, so that a lifting-out of the caliper outwardly in radial direction is, advantageously, prevented.

The brake shoes are supported in the radial direction at the bearing elements outside the circumference of the brake disc, so that, advantageously, the brake carrier is designed solid with the steering knuckle as an integrated steering knuckle. This allows an easy assembly-line mounting, since upon mounting of the brake disc the brake shoes are adapted to be suspended on the integrated steering knuckle and thereupon the brake housing can be fitted from the top over the brake disc and the brake shoes and be screwed or bolted to the steering knuckle.

In an advantageous manner, radially outwardly directed projections of the brake carrier arms engage grooves provided in the axial ends of the brake shoe, so that the frictional force which occurs at the brake shoe is advantageously transmittable to both brake carrier arms at least in the presence of more elevated brake contact forces, so that the force is distributed to two arms.

Advantageously, the brake housing is supported in the range of its bridge section at tangential ends of the external brake shoe in the secant direction, so that, on one hand, the brake housing cannot move outwardly in circumferential direction and, on the other hand, the brake shoe is reinforced in circumferential direction by the bridge section which is positioned in between.

Identical brake shoes are advantageously provided for the disc brake on the side of the piston and on that of the wheel rim, so that the internal brake shoe and the external one are adapted to be interchanged without problems and the brake shoes cannot be mixed up when new brake shoes have to be mounted.

In one simple design embodiment of the present invention, a central spring is retained within a guide of the brake housing an braces the brake shoes between the carrier arms and the brake housing, so that the brake shoes are retained in such a manner as to avoid any rattling noise.

In a simple design development of the present invention the internal brake shoe is retained at the piston and, thus, at the brake housing by a three-finger clip projecting into the piston, so that the internal brake shoe is adapted to be fitted from the top over the brake disc and to be mounted to the steering knuckle jointly with the brake housing.

In one advantageous embodiment of the present invention, elastic guide bushings are inserted in guide bores of the brake housing, which elastically and yieldingly support the brake housing at guide pins which are fixed in the brake carrier. A dry-type guide of the bushing is achieved in this way, the bushing being fabricated from slippable EPDM (ethylene-propylene-diene-monomer) rubber material, that is to say, a slippable rubber being provided.

In an advantageous manner, longitudinal ribs extend in the axial direction across the bridge section of the brake housing, so that a widening of the brake housing when the brake is being actuated is avoided at least partly because the longitudinal ribs of the bridge section reinforce the cast-metal brake housing at this point.

In another development of the present invention the brake housing is configured two parts and is sectioned into an internal and an external part of the brake housing in a radial plane which is offset in respect of the brake disc in the direction of the actuating device. The results achieved by this is that the actuating housing can to be tooled independently of the external stem, so that the bore for the piston can be drilled in the actuating housing without any major requirements as to tools.

In this context, different materials can be employed for both parts, that is to say, for example, aluminum and spheroidal cast iron (GGG, spheroidal graphite cast iron) or grey cast iron (GG) and spheroidal cast iron, in order to advantageously save on weight.

In an advantageous manner, the flange section is axially centrally disposed on the brake housing, so that the internal part and the external part are advantageously adapted to be screwed or bolted together, the screw heads projecting in the direction of the vehicle center and the thread projecting into a reinforced external part of the brake housing which is accessible at this point due to the radially expanding wheel rim.

In a further simple design embodiment of the present invention, the brake housing is configured in one part and is tightly pressure-sealed by a cover lid and by a sealing ring interposed between the cover lid and the housing, so that the bore can be drilled with simple tools from the side of the brake housing facing away from the external stem. Advantageously, the circular cover lid is mountable in such a manner that the hose connection of the cover is adjustable over a plane of 360 degrees, so that for different vehicle types the hoses can reach the cover starting from different points. Alteratively, different cover lids with different hose connections as to the azimuth angle may, advantageously, be employed. Material and, thus, weight are saved in the one-part design.

The internal stem is substantially furnished with an actuating housing comprising a piston-and-cylinder unit, onto which a radially extending flange is fitted. Ribs are positioned on the flange which serve for stiffening and which advantageously constitute a precautionary measure against an expansion of the brake housing, since the ribs extend ray-shape for the actuating housing across the flange.

In the following, embodiments of the present invention will be described in more detail with reference to accompanying drawings.

DETAILED DESCRIPTION OF THE INVENTION

Figure 1:
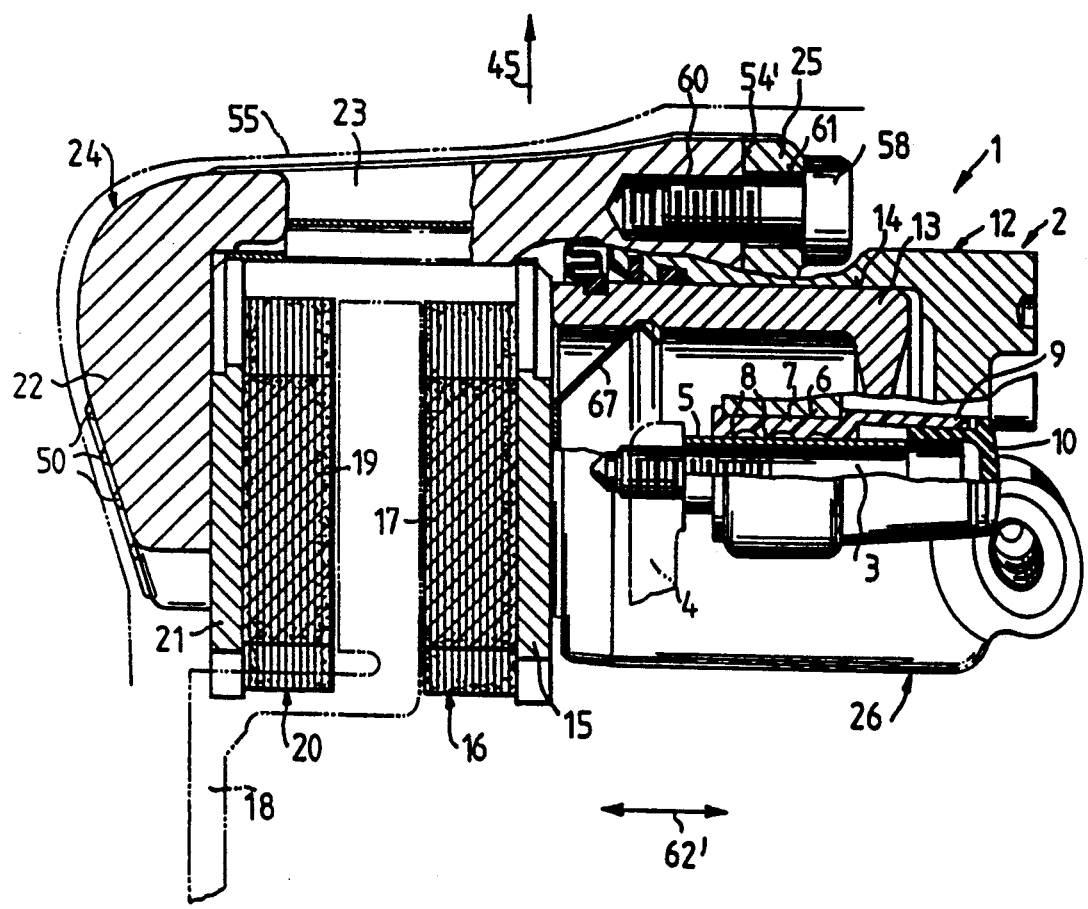
FIG. 1 shows a longitudinal section through a spot-type disc brake constructed in accordance with the present invention.
Figure 2:
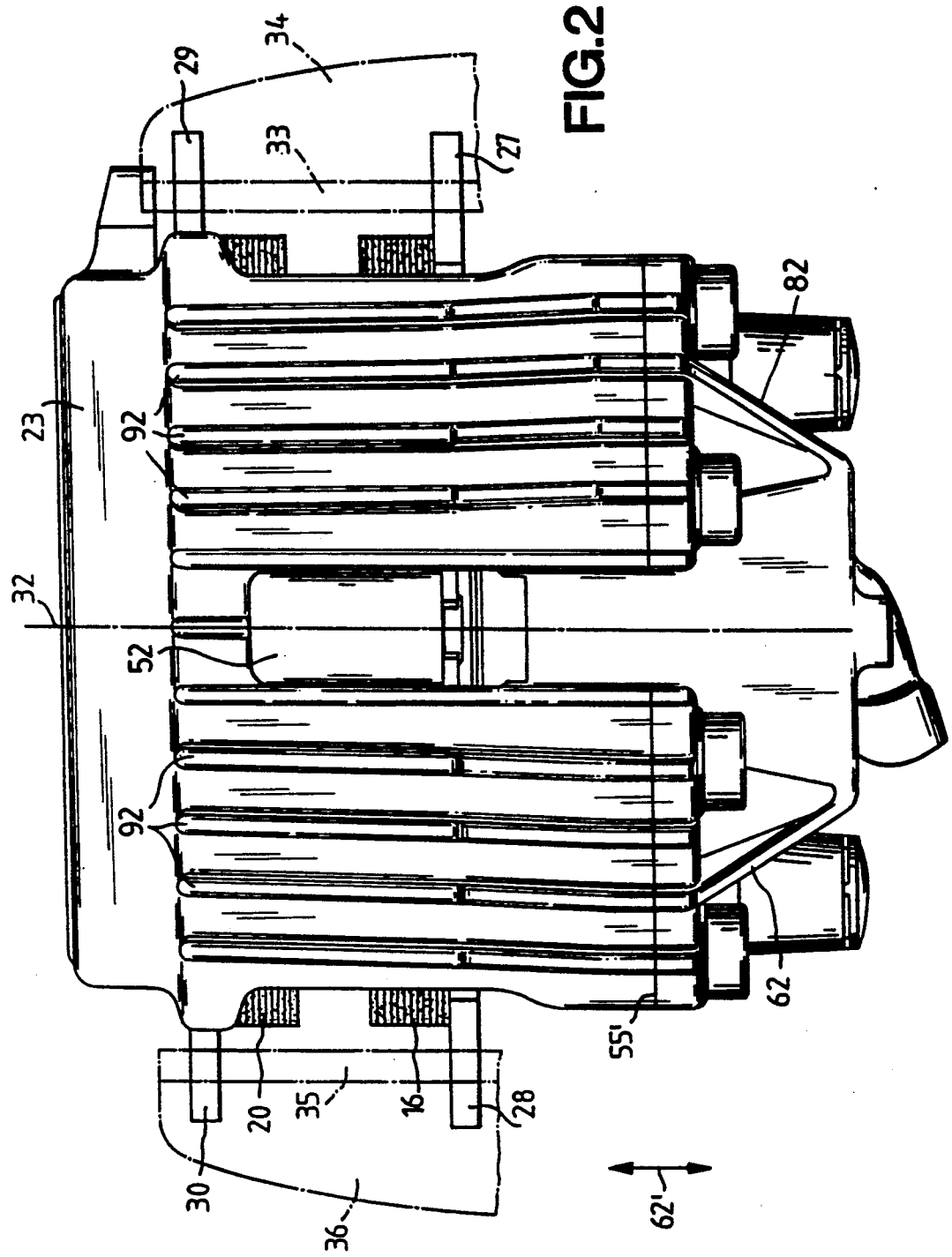
FIG. 2 shows the top view of the spot-type disc brake of FIG. 1.
Figure 3:
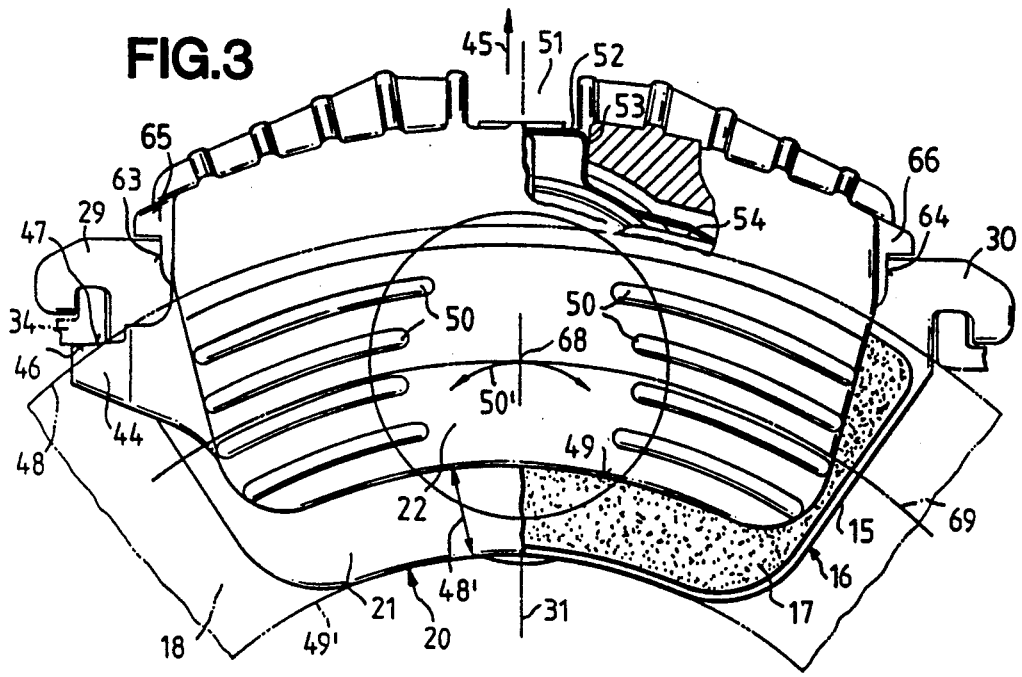
FIG. 3 shows a partly sectional lateral view of the spot-type disc brake of FIG. 1.
Figure 4:
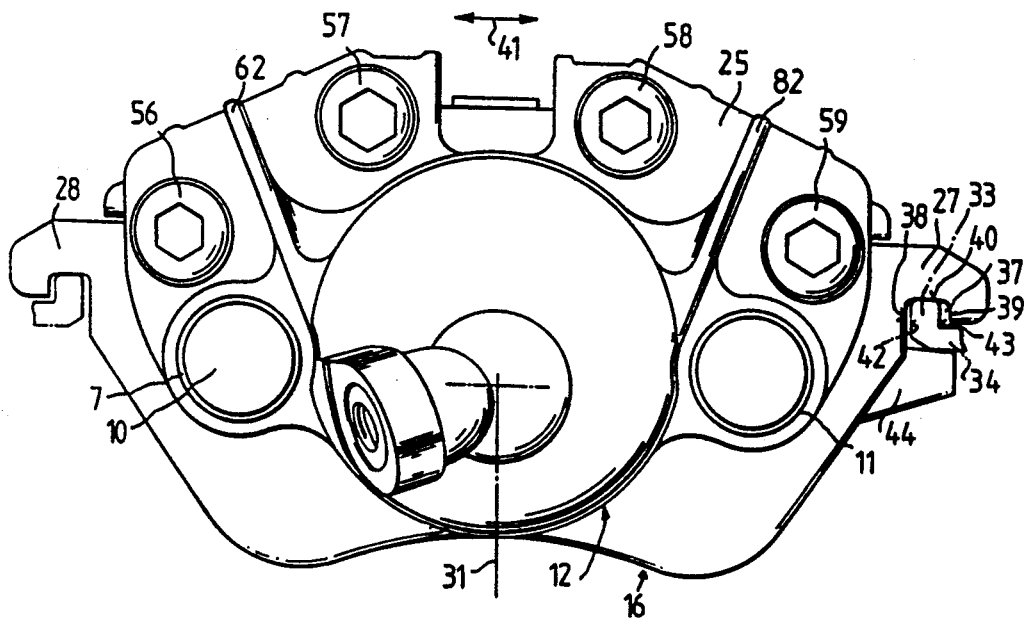
FIG. 4 shows the back side of the spot-type disc brake of FIG. 1.

In the Figures, components being identical or corresponding to one another are given identical reference numerals.

FIGS. 1 to 4 show a spot-type disc brake with a U-shaped brake housing 2. A pin 3 is screwed into a brake carrier 4 and surrounded by a protective sleeve 5 which is defined at the brake carrier in axial direction by pin 3. The pin 3 and the protective sleeve 5 extend through a guide bore 6 of the brake housing 2. An elastic guide and damping bushing 7 surrounds the protective sleeve 5 and centers the pin 3 with the aid of its ribs 8 within the opening 6 of the brake housing 2. An axial extension 9 of the damping bushing 7 serves to accommodate a protective cap 10. By means of two guides of identical set-up and composed of the pin 3, protective sleeve 5 and damping bushings 7, 11, the brake housing 2 is supported symmetrically at the brake carrier 4. In an actuating housing 12 of the brake housing 2, a piston 13 of an actuating device 13, 14 is slidingly supported within a cylinder 14. Piston 13 presses directly against a carrier plate 15 of a brake shoe 16 which is, thus, brought in abutment, with a friction lining 17, against first side of a brake disc 18. A friction lining 19 of a second brake shoe 20 is urged against the other side of the brake disc 18 by the force of reaction of the brake housing 2. In this context, an external stem 22 abuts against a carrier plate 21 of the brake shoe 20. The brake housing 2 is substantially comprised of the external stem 22 and a bridge section 23 which form an external part 24 of the brake housing 2, and of the actuating housing 12 and a flange 25 which form an internal part 26 of the brake housing 2. Both shoes 16, 20 are formed with tangential ends 27, 28, 29, and 30 which are of identical configuration because of the identical shape of the brake shoes and are symmetrical in respect of a plane of symmetry 31, 32. The tangential ends 27, 29 rest on a radially projecting attachment 33 of a first brake carrier arm 34, and the ends 28, 30 rest on a radially projecting attachment 35 of a second brake carrier arm 36. The attachments 33, 35 extend over such a length in the axial direction that the tangential ends 27, 28, 29, 30 of both brake shoes 16, 20 which are positioned opposite one another rest on one and the same attachments 33, 35. The tangential ends 27, 28, 29, 30 straddle the attachments 33, 35. For reasons of simplicity and because of the analogy, the straddling position will be described in more detail only with reference to one tangential end 27. The tangential end 27 is furnished with a groove 37 which is directed radially inwardly and is defined in the circumferential direction by groove surfaces 38, 39 and in the radially upward direction by a base surface 40. The base surface 40 rests on the radial attachment 33 of the brake carrier arm 34. Upon brake operation, the groove surfaces 38, 39 are brought into contact with attachment surfaces 42, 43 of the radial attachment 33 which extend in the secant direction 41, and for that matter, in such a way that a pull-push operation is safeguarded this means that the plays in the groove between the attachment are sized such that the brake shoe comes into contact with the brake carrier arm first on the entering side and thereafter on the leaving side, so that the brake shoe is first pulled before it is pushed, in order to advantageously guarantee a uniform wear of the friction linings. A lifting-out tooth 44 extends in secant direction 41 from the external stem 22 of the brake housing 2 and makes catch beneath the brake carrier arm 34, so that any lifting-out of the brake housing 2 in the radial direction 45 will be prevented. In this connection, an abutment surface 46 of the lifting-out tooth 44 which extends in the secant direction 41 comes into contact with an abutment-surface 47 of the brake carrier arm 34 extending in the secant direction 41. The ends 27, 28, 29, and 30 are positioned outside the brake disc circumference 48 of the brake disc 18. The external stem 22 presents a lower edge 49 which extends at a constant distance 48 from the circumference 48 and from the external circumference 49 of the brake disc 18. Five ribs 50 extending in the circumferential direction 50 are positioned on the stem 22. In a guide 51 of the housing 2, a central spring 52 is arranged which takes support, on one side, at walls 53 defining the guide and, on the other side, on a radially external edge 54 of the brake shoes 16, 20. The internal part and the external part 24, 26 of the brake housing 2 are divided in a tangential plane 54', 55' which is determined by the axes 54', 55'. In this configuration, the flange 25 is positioned axially centrally on the actuating housing 12, so that the bridge section 23 of the external part 24 is allowed to expand over the actuating housing 12 in the radial direction 45 adapting itself to a wheel rim contour 55. In this context, the bridge section is dimensioned sufficiently thick radially so as to allow screws 56 to 59 to be screwed with their threaded length 60 into the bridge section 23. The screws 56 to 59 reach through a bore 61 of the flange 25. Ribs 82, 62 are provided on the flange 25 in a ray-shaped pattern starting form the actuating housing 12. Longitudinal ribs 92 extend on the bridge section in the axial direction 62'. Front surfaces 63, 64 of the tangential ends 29, 30 support the brake housing 2 at its front sides 65, 66. The internal brake shoe 16 is retained at the piston 13 by a three-finger clip 67. Starting from the gravity center 68 of the piston, a circumferential gravity center line 69 for the external brake shoe 20 runs in the circumferential direction 50' which is uniformly surmounted at leas t over a partial circumference by the stem 22. In this manner, a uniform distribution of pressures and of cast metal advantageously results for the external stem 22.

Figure 5:
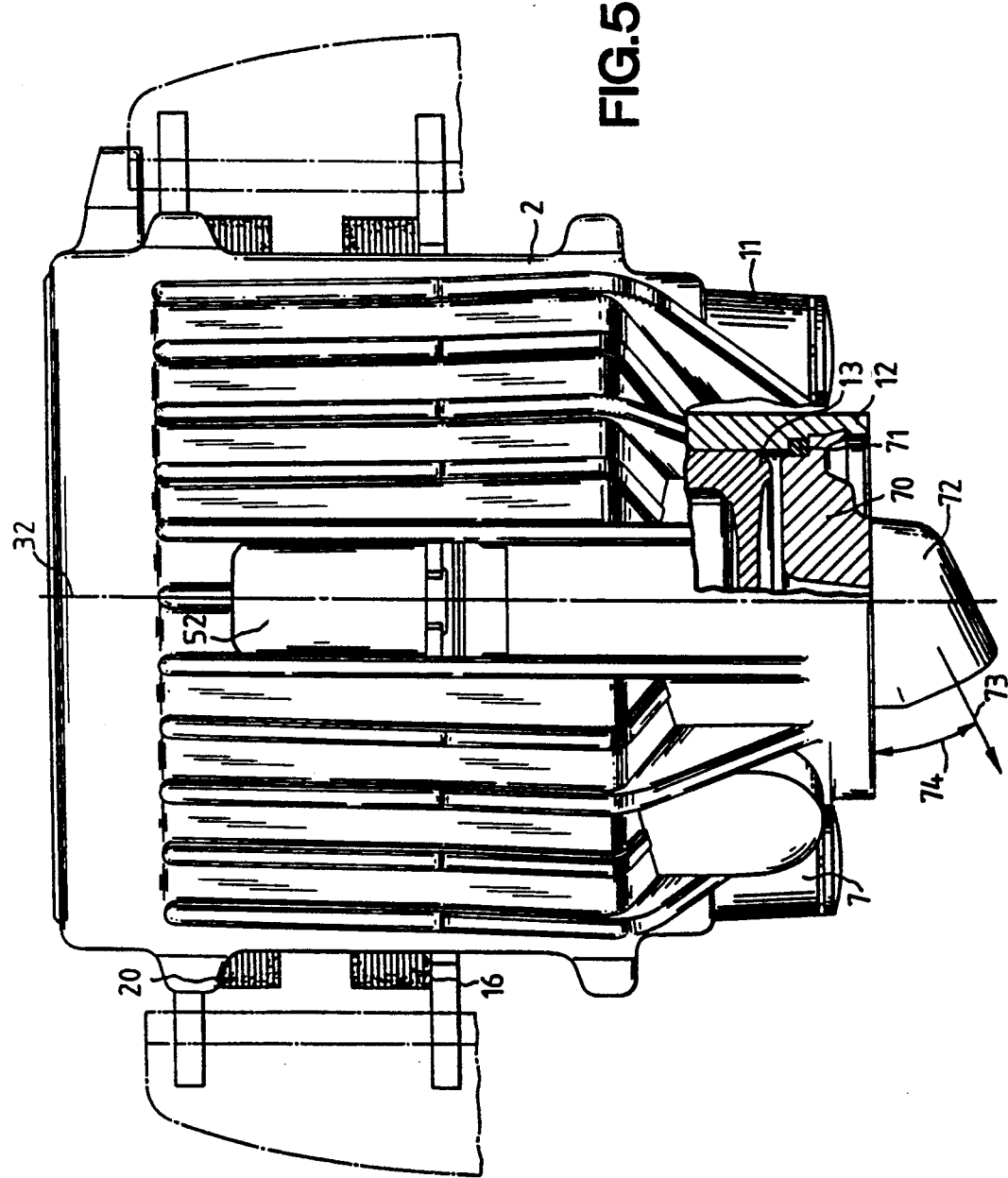
FIG. 5 shows a spot-type disc brake, constructed in accordance with the present invention, with a cover lid.

FIG. 5 shows a one-part brake housing 2 whose actuating housing 12 is closed by a cover lid 70 on the side pointing in the direction of the brake center. In this context, a seal 71 is interposed between the actuating housing 12 and the cover lid 70, which seals off the housing in a pressure-tight manner. A hose connection 72 which points in the direction 73 is configured at the cover lid 70. During mounting, the hose connection 72 is adapted to be rotated in the plane 54', 55'. Alternating, different cover lids 70 with different hose connections 72 as to the azimuth angle 74 may be provided to be mounting.

What is claimed:

1. A spot-type disc brake comprising:
   a brake disc in the form of a circular ring, having a first face and a second face opposite from said first face;
   first and second brake carrier arms positioned outward of the radial extend of said brake disc;
   first and second brake shoes mounted on said first and said second brake carrier arms on opposite sides of said brake disc for movement along said brake carrier arms against said opposite first and second faces of said brake disc;
   a piston and cylinder unit;
   first coupling means coupling said piston and cylinder unit to said first brake shoe for moving said first brake shoe against and away from said first face of said brake disc in response to said piston and cylinder unit;
   and second coupling means coupling said piston and cylinder unit to said second brake shoe for moving said second brake shoe against said second face of said brake disc in response to said piston and cylinder unit, said second coupling means including an external stem having a plurality of circumferentially extending ribs and a continuous and uninterrupted bearing surface which: (a) bears against said second brake shoe when said second brake shoe is moved against said second face of said brake disc, and (b) is defined by a radially inner edge which extends in a substantially circumferential direction along its entire length.

2. A spot-type disc brake according to claim 1 wherein said first and said second brake shoes are identical and interchangeable.

3. A spot-type disc brake according to claim 1 wherein said second coupling means include a spring urging said first and said second brake shoes downward against said first and said second brake carrier arms.

4. A spot-type disc brake according to claim 1 wherein said first coupling means include a three-finger clip bearing against said first brake shoe and projecting into said piston and cylinder unit.

5. A spot-type disc brake according to claim 1 wherein said first and said second coupling means are parts of a brake housing and said brake housing further includes axially extending guide bores.

6. A spot-type disc brake according to claim 5 further including a brake carrier, axially extending guide pins fixed to said brake carrier and elastic guide bushings in said guide bores in said housing through which said guide pins extend.

7. A spot-type disc brake according to claim 1 wherein said second coupling means include ribs extending axially of said disc brake.

8. A spot-type disc brake according to claim 1 wherein said first and said second coupling means are parts of a brake housing and said brake housing further includes a radially outwardly extending flange, positioned in a central axial position on said brake housing, and a bridge section extending between said flange and said external stem.

9. A spot-type disc brake according to claim 8 wherein said flange has ribs disposed in a ray-shape.

10. A spot-type disc brake according to claim 1 wherein said piston and cylinder unit has a piston bore and said disc brake further includes a sealing ring at said piston bore and a cover lid pressing against said sealing ring to form a pressure-tight closure at said piston bore.

11. A spot-type disc brake according to claim 1 wherein said brake disc includes a radially inner edge and a radially outer edge and said radially inner edge of said external stem extends along its lateral length at a first constant radial distance from said radially inner edge of said brake disc and a second constant radial distance from said radially outer edge of said brake disc.

12. A spot-type disc brake, in particular for automotive vehicles, with a brake disc in the form of a circular ring having a brake disc radially inner edge and a brake disc radially outer edge with two brake carrier arms being positioned at a distance from each other in the direction of a secant in respect of the brake disc, with two brake shoes resting radially on the brake carrier arms, with a brake housing which straddles the brake shoes and the brake disc in a U-shaped manner, with a piston-and-cylinder unit being positioned within a first, internal, stem of the housing and by means of which the first brake shoe allows to be urged directly against a first side of the brake disc, and with a second, external stem being coupled to the first stem through a bridge section and urging the second brake shoe indirectly against the other side of the brake disc, characterized in that said external stem has a radially internal edge which extends at a constant radial distance from and is concentric with said brake disc radially inner edge and said brake disc radially outer edge and ribs which run in a circumferential direction.

13. A spot-type disc brake as claimed in claim 12, characterized in that the said external stem is furnished with a tooth projecting in said secant direction which catches radially internally beneath said brake carrier arms.

14. A spot-type disc brake as claimed in claim 13, characterized in that the said brake shoes are formed with tangential ends with are supported at the said brake carrier arms radially outside the brake disc circumference.

15. A spot-type disc brake as claimed in claim 14, characterized in that the said tangential ends of the said brake shoes straddle, with radially inwardly opening grooves, radially outwardly direction projections of the said brake carrier arms which are sized such relative to each other that the frictional force which occurs at the said brake shoes is transmittable to both said brake carrier arms at least in the presence of a brake contact force.

16. A spot-type disc brake as claimed in claim 15, characterized in that the said tangential ends of the said second brake shoe present substantially radially extending front surfaces facing each other at which the said brake housing takes support.

17. A spot-type disc brake as claimed in claim 12, characterized in that the said brake shoes are identical.

18. A spot-type disc brake as claimed in claim 12, characterized in that a central spring being retained within a guide of the said brake housing braces both said brake shoes against the said carrier arms.

19. A spot-type disc brake as claimed in claim 12, characterized in that the said first brake shoe is retained at the said piston unit by a three-finger clip which projects into the said piston unit.

20. A spot-type disc brake as claimed in claim 12, characterized in that elastic guide bushings are positioned within guide bores of the said brake housing which elastically and yieldingly support the said brake housing at guide pins which are fixed to the brake carrier arms.

21. A spot-type disc brake as claimed in claim 12, characterized in that longitudinal ribs extend in axial direction on the bridge section of the said brake housing.

22. A spot-type disc brake as claimed in claim 12, characterized in that a substantially radially outwardly extending flange is axially centrically disposed on the said brake housing and in that the said internal and external stems are coupled together.

23. A spot-type disc brake as claimed in claim 22, characterized in that ribs are positioned on the said flange of said brake housing, which ribs extend ray-shape from said brake housing across said flange.

24. A spot-type disc brake as claimed in claim 12, characterized in that a piston bore of the brake housing is closed pressure-tightly by a cover lid and by a sealing ring which is interposed between the said cover lid and the said housing.

25. A spot-type disc brake comprising:
a brake disc in the form of a circular ring, having a first face and a second face opposite from said first face;
first and second brake carrier arms positioned outward of the radial extent of said brake disc and each having an upwardly extending attachment;
first and second brake shoes each having opposed tangential ends by which said first and said second brake shoes are mounted on said first and said second brake carrier arms on opposite sides of said brake disc for movement along said brake carrier arms against said opposite first and second faces of said brake disc, each of said tangential ends of said brake shoes having a groove into which said upwardly extending attachments of said brake carrier arms is fitted;
a piston and cylinder unit;
first coupling means coupling said piston and cylinder unit to said first brake shoe for moving said first brake shoe against and away from said first face of said brake disc in response to said piston and cylinder unit;
and second coupling means coupling said piston and cylinder unit to said second brake shoe for moving said second brake shoe against said second face of said brake disc in response to said piston and cylinder unit, said second coupling means including an external stem having: (1) a plurality of circumferentially extending ribs, (2) a pair of radially extending teeth which extend beneath said first and said second brake carrier arms, and (3) a continuous and uninterrupted bearing arms, and (3) a continuous and uninterrupted bearing surface which: (a) bears against said second brake shoe when said second brake disc, and (b) is defined by a radially inner edge which extends in a substantially circumferential direction along its entire length.

* * * * *

UNITED STATES PATENT AND TRADEMARK OFFICE
CERTIFICATE OF CORRECTION

PATENT NO. : 5,238,090
DATED : August 24, 1993
INVENTOR(S) : Rolf Weiler

It is certified that error appears in the above-indentified patent and that said Letters Patent is hereby corrected as shown below:

Column 5, claim 1, line 41, delete "extend" should read
--extent--

Column 7, claim 14, line 3, (2nd occurrence) delete "with" should read
--which--

Column 7, claim 15, line 9, delete "direction" should read --directed--

Column 8, claim 25, lines 39 and 40, delete "and (3) a continuous and uninterrupted bearing arms,"

Column 8, claim 25, line 42, (2nd occurrence) after "second" add --brake shoe is moved against said second face of said--

Signed and Sealed this

Twenty-fourth Day of May, 1994

Attest:

BRUCE LEHMAN

*Attesting Officer*  *Commissioner of Patents and Trademarks*